United States Patent [19]
Dippel

[11] 4,081,207
[45] Mar. 28, 1978

[54] SCANNING LENS SYSTEM

[75] Inventor: Charles Dippel, Lockland, Ohio

[73] Assignee: Cincinnati Electronics Corporation, Cincinnati, Ohio

[21] Appl. No.: 701,494

[22] Filed: Jul. 1, 1976

[51] Int. Cl.$^2$ .................. G02B 27/17; G02B 23/02; G02B 9/34; G02B 5/04

[52] U.S. Cl. .................. 350/6.4; 350/1.3; 350/23; 350/223; 350/286

[58] Field of Search .............. 350/6, 23, 173, 285, 350/286, 220, 223, 203

[56] References Cited
U.S. PATENT DOCUMENTS

| | | | |
|---|---|---|---|
| 1,006,230 | 10/1911 | Kollmorgen | 350/23 |
| 2,009,816 | 7/1935 | Rantsch et al. | 350/286 |
| 2,317,988 | 5/1943 | Forssberg | 350/286 |
| 3,350,156 | 10/1967 | Adams | 350/23 X |
| 3,915,559 | 10/1975 | Fleischman | 350/220 |

OTHER PUBLICATIONS

B. H. Walker, "Pechan Derotation Prism . . ." Optical Engineering, vol. 13, No. 6, Nov./Dec. 1974, pp. G233-G234.

Primary Examiner—John K. Corbin
Assistant Examiner—John D. Lee
Attorney, Agent, or Firm—Lowe, King, Price & Markva

[57] ABSTRACT

A circular scanning lens system comprises a Petzval lens device having an optical axis on which are located first and second spaced lenses. A Rantsch derotator is positioned between the lenses and has an optical axis coincident with the axis of the Petzval lens, about which elements of the derotator are turned. The scanning lens system is adapted to be used with a raster scan system to remove the tendency of the raster scan system to rotate an image as the image is deflected in a straight line across a focal plane.

14 Claims, 4 Drawing Figures

SCANNING LENS SYSTEM

FIELD OF THE INVENTION

The present invention relates generally to optical scanning lens systems and more particularly to a scanning lens system including a Petzval lens device in combination with a Rantsch derotator.

BACKGROUND OF THE INVENTION

Numerous circular scanning lens systems have been developed and are frequently utilized in connection with raster scanning of a field of view, wherein a relatively short, narrow portion of the field of view is instantaneously projected onto a focal plane. During each raster line scan the projected portion of the field of view is deflected in a substantially straight line across the focal plane. For certain types of raster scan mechanisms, as the field of view is scanned across a line, there is a tendency for the image to rotate as it is projected on the focal plane. In the prior art, circular scanning lens systems have been synchronized with the deflection to remove the tendency for the field to rotate.

The prior art circular scanning lens systems have generally included many optical elements which introduce substantial intensity losses in transmitting the optical image from the field of view to the focal plane. Hence, the intensity of the image projected onto the focal plane is substantially reduced, whereby the lens system must have a relatively low effective f/number, which has deleterious effects on resolution and depth of field.

In one prior art configuration, a folded optic system is utilized. The folded optic system, together with the requirement for a large number of elements and the spacing required between these elements, results in a package that is rather large. In addition, the large number of elements and folded optic configuration causes difficulties in fabricating and aligning the lens system, thereby increasing the costs. While other circular scanning lens systems do not require folded optics, they do not involve the use of very large and heavy scanning prisms that are positioned in front of a simple lens. Still other circular scanning devices employ mechanically scanned prisms that are positioned in front of an array of derotating prisms, thereby providing a relatively lossy transmission medium, large space and weight requirements, and relatively high costs.

BRIEF DESCRIPTION OF THE INVENTION

In accordance with one aspect of the invention, a circular scanning lens system comprises a Petzval lens device having an optical axis that is coincident with a turning axis for elements of a Rantsch derotator. A Petzval lens device is defined as four lens elements ordered in two pairs, relatively widely separated from each other. The first and second lens elements of the first pair are respectively convex-convex and concave-concave to project a converging beam, while the lens elements of the second pair are respectively convex-convex and convex-convex. The second lens element of the second pair is almost flat, being only slightly convex-convex. The elements of the first pair of lenses may have a small air space between them or be cemented together, depending upon the wavelength being handled by the optical system, while the elements of the second pair usually have a small air space between them, regardless of wavelength.

Elements of the Rantsch derotator are positioned between the first and second pairs of Petzval lenses. The Rantsch derotator is adapted to be turned about the optical axis of the Petzval lens device to achieve circular scanning of a point source image located at infinity. The first pair of lenses of the Petzval defines the angular extent of point sources coupled between the lens system and infinity, while the second pair focuses the image on a focal plane.

Circular scanning is achieved with the combination since the Rantsch derotator includes a pair of spaced reflecting prisms having axes coincident with each other and the Petzval lens. The first prism includes a first internally reflecting surface sloping at a predetermined angle in a first direction with respect to the optical axis and a second internally reflecting surface parallel to the axis. An image in the field of view of the first pair of Petzval lenses is projected to the first surface from which is reflected and projected to the second surface. The image is reflected from the second surface and passes out of the first prism through the first surface and into the second prism where it is cast on a third internal reflecting surface. The third reflecting surface slopes relative to the optical axis at the predetermined angle in an opposite direction from the first sloping internal reflecting surface. The image internally reflected by the third surface is projected out of the second prism parallel to the optical axis and is coupled to the second lens pair of the Petzval lens, where it is focused onto the focal plane.

The circular scanning lens system of the present invention is preferably employed in connection with an optical system for raster scanning a field of view onto the focal plane. As a line of the raster is scanned, there is a tendency for the image to be rotated. The circular scanning system of the present invention provides a simple means of removing the tendency for the image to rotate. To this end, the two prisms of the Rantsch derotator are turned in synchronism with a reflector that scans an image across a line.

It is accordingly, an object of the present invention to provide a new and improved circular scanning optical system.

Another object of the invention is to provide a new and improved circular scanning lens system having a reduced number of elements, thereby to provide a lens system having increased transmission, as well as decreased cost, size and weight.

A further object of the invention is to provide a new and improved circular scanning lens system which is relatively simple in construction, is easily fabricated, is easily aligned, and thereby has a relatively low cost.

Another object of the invention is to provide a new and improved circular scanning lens system having very high resolution.

Another object of the invention is to provide a circular scanning lens system having a relatively wide aperture and a high back focal length.

Still a further object of the invention is to provide a new and improved circular scanning lens system that is particularly adapted to be utilized in connection with a raster scanning device.

The above and still further objects, features and advantages of the present invention will become apparent upon consideration of the following detailed description of one specific embodiment thereof, especially when taken in conjunction with the accompanying drawing.

DETAILED DESCRIPTION OF THE DRAWING

Figure 1:
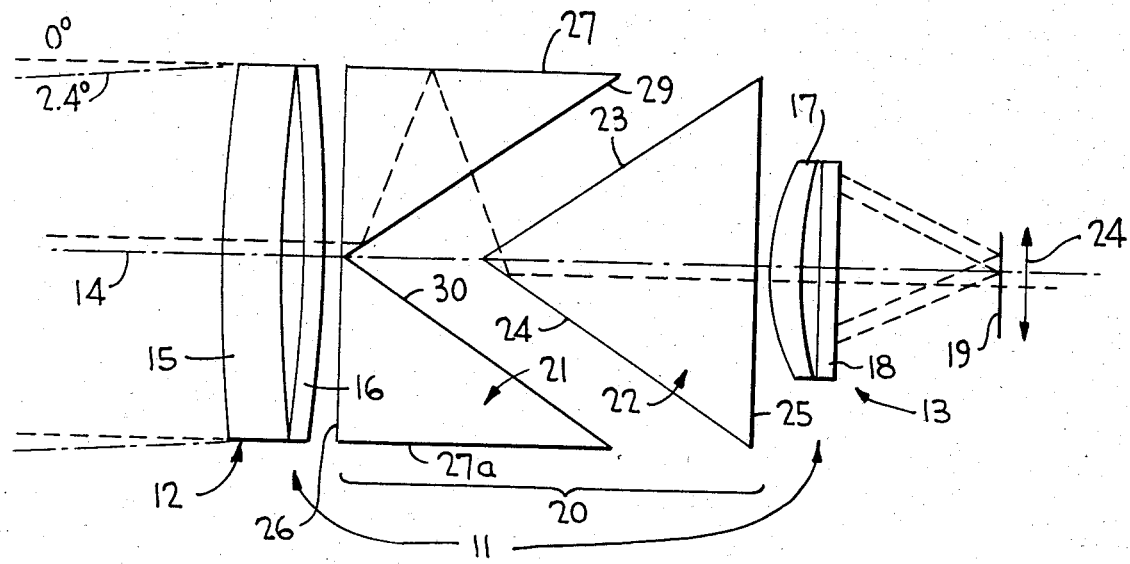
FIG. 1 is a cross-sectional view of a preferred embodiment of a circular scanning lens system in accordance with the present invention.

Reference is now made to FIG. 1 of the drawing wherein there is schematically illustrated a Petzval lens doublet device 11 including two spaced lenses 12 and 13, having a common optical axis 14. Lens 12 includes two lens elements 15 and 16, while lens 13 includes two lens elements 17 and 18. Each of lens elements 15, 17 and 18 has a convex-convex configuration, while lens element 16 has a concave-concave configuration. The elements of lens 12 are either cemented together or closely spaced relative to each other, depending upon the optical wavelength being handled by the particular optical system. Elements 17 and 18 of lens 13 have a small air space between them. For infrared wavelengths in the one—five micrometer region, there is also an air space between lens elements 15 and 16; for visible light applications, adjacent faces of lens elements 15 and 16 would usually be cemented together.

Lens 12 defines the angular extent or field of view of images to which the lens system of FIG. 1 is responsive. For the infrared one—five micrometer region, in one embodiment there is a ±2.4 degree field of view. In this embodiment, the effective focal length of the total optical package of FIG. 1 is 3 inches and the collecting aperture, as defined by the diameter of lens 12, is 2.5 inches which results in an effective f/number of 1.2. The back focal length between lens 13 and focal plane 19, on which a point source image in the field of view of lens 11 is projected, is one inch or greater. Lens 13 projects a focused image of the point source in the field of view of lens 12 onto a screen or detector positioned at focal plane 19. For scanning applications, focal plane 19 is preferably a line detector having an extremely narrow width in a plane at right angles to the plane of the sheet defining FIG. 1, as described infra.

Positioned between lenses 12 and 13 is a Rantsch derotator 20 including prisms 21 and 22 having a common optical axis that is coincident with optical axis 14 of Petzval lens device 11. The shape of downstream prism 22 is a square when viewed from the focal plane and looking forward along the optical axis 14. Thereby, element 22 includes sloping planes 23 and 24 that extend at equal angles and in opposite directions from axis 14, as well as an exit plane 25 that extends at right angles to axis 14. The angle of surfaces 23 and 24 relative to axis 14 is such that an image projected through surface 23 is internally reflected at surface 24 and vice versa.

The shape of element 21 is also a square when viewed from the front of the optical package and looking backward along the optical axis 14. Thereby, element 21 includes an entrance face 26 responsive to a collimated beam exiting lens 12; the face is at right angles to axis 14. Element 21 also contains sloping planes 29 and 30 which are spaced from and are respectively parallel to sloping surfaces 23 and 24 of prism 22. The exterior, plane surfaces 27 and 27A of prism 21 are coated with a reflecting material, such as a silver film.

A light ray parallel to and laterally displaced from axis 14 is projected through entrance face 26 against surface 29, where it is internally reflected to reflecting face 27. At face 27, the image is again internally reflected within prism 21 and passes out of the prism through surface 29. Upon exiting surface 29, the image passes through an air space until it reaches surface 23, through which it passes, until it is internally reflected at surface 24 of prism 22. After being reflected at surface 24, the light ray passes through surface 25 and emerges from prism 22 parallel to axis 14. Of course, the angles of surfaces 23, 24, 29 and 30 are selected to enable optical images to be either reflected from them internally or to be passed through them.

Figure 2:
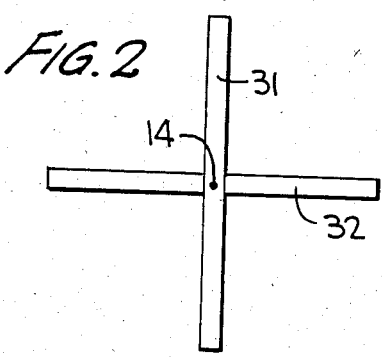
FIG. 2 is a view of a line detector, of the system of FIG. 1, at the focal plane as projected into the field of view as two different angles.

To achieve circular scanning of a point source located at infinity in the field of view covered by lens 11, prisms 21 and 22 are rotated together by a mechanical mechanism (not shown) about axis 14. The relatively narrow image of a line detector at focal plane 19 is projected by the lens system of the present invention into the field of view as a relatively narrow, vertically extending stripe 31 (FIG. 2) with prisms 21 and 22 at a predetermined angle. In response to prisms 21 and 22 rotating about axis 14, stripe 31 is rotated in the field of view about axis 14, so that a forty-five degree rotation of prisms 21 and 22 results in a 90° rotation of the image of the line detector at focal plane 19 into stripe 32 that extends horizontally and is centered about axis 14. By the complementary laws of optics, there is a circular scanning of all points in the field of view of lens 11 onto the line detector at focal plane 19 in response to rotation of prisms 21 and 22.

In one embodiment, particularly adapted for the one—five micrometer wavelength region, lens elements 15, 16, 17 and 18 are zinc selenide and the prisms 21 and 22 are calcium fluoride. The radii of curvature of the different optical surfaces, the spacing between adjacent surfaces and the indices of refraction of the materials for this embodiment are given as follows:

TABLE I

| RADIUS (INCH) | SPACE (INCH) | INDEX |
| --- | --- | --- |
| 5.0 | .35 | 2.436 |
| 12.389 | .15 | 1.0 |
| −11.25 | .15 | 2.436 |
| −18.22 | .10 | 1.0 |
| ∞ | 1.87 | 1.412 |
| ∞ | .56 | 1.0 |
| ∞ | 2.12 | 1.412 |
| ∞ | .10 | 1.0 |
| 1.7875 | .20 | 2.436 |
| 3.800 | .10 | 1.0 |
| 125.0 | .10 | 2.436 |
| 60.6875 | | 1.0 |

In Table I, first column, a negative sign indicates that the lens surface is concave, while no sign indicates that the lens surface is convex. In construing Table I, the first entry (5.0 – 0.35 – 2.436) indicates that the radius of curvature of the entrance face of lens 15 is five inches, that there is a 0.35 inch spacing between the entrance and exit faces of lens 15 and that the index of refraction of lens element 15 between the entrance and exit surfaces of the lens element is 2.436. The second line (12.389 – 0.15 – 1.0) indicates that the radius of curvature of the entrance face of lens element 15 is 12.389 inches, that there is a 0.15 inch spacing between the exit and entrance faces of elements 15 and 16, and that the material between the exit and entrance faces of elements 15 and 16 has an index of refraction of 1.0, i.e., that the material between the exit and entrance faces of lens elements 15 and 16 is air.

The circular scanning embodiment is not well corrected for astigmatism because it is designed for a long thin detector in focal plane 19. If correction for lens astigmatism is necessary, an alternate design of the lens elements could be achieved by modifying the radii of curvature of the different lens surfaces.

The lens system of the present design is particularly adpated for basically monochromatic operation. If it is necessary to cover a relatively wide wavelength range, the two zinc selenide elements, such as elements 15 and 16, forming each of lenses 12 and 13 could be replaced by achromatic pairs, whereby elements 15 and 17 would be formed of zinc selenide and elements 16 and 18 would be formed from zinc sulfide, in one embodiment.

By utilizing calcium fluoride as prisms 21 and 22, the image is projected from surface 27 through surfaces 29 and 23 at an acute angle, i.e., the image is not projected through these surfaces at right angles to the surfaces. This has the possible deleterious effect of increasing aberrations in the optical image projected by the lens system. If zinc selenide is used as the material for prisms 21 and 22 the optical image would be projected at right angles through surfaces 29 and 23, as well as the air gap between them, thereby to reduce aberrations in the optical image.

Figure 3:
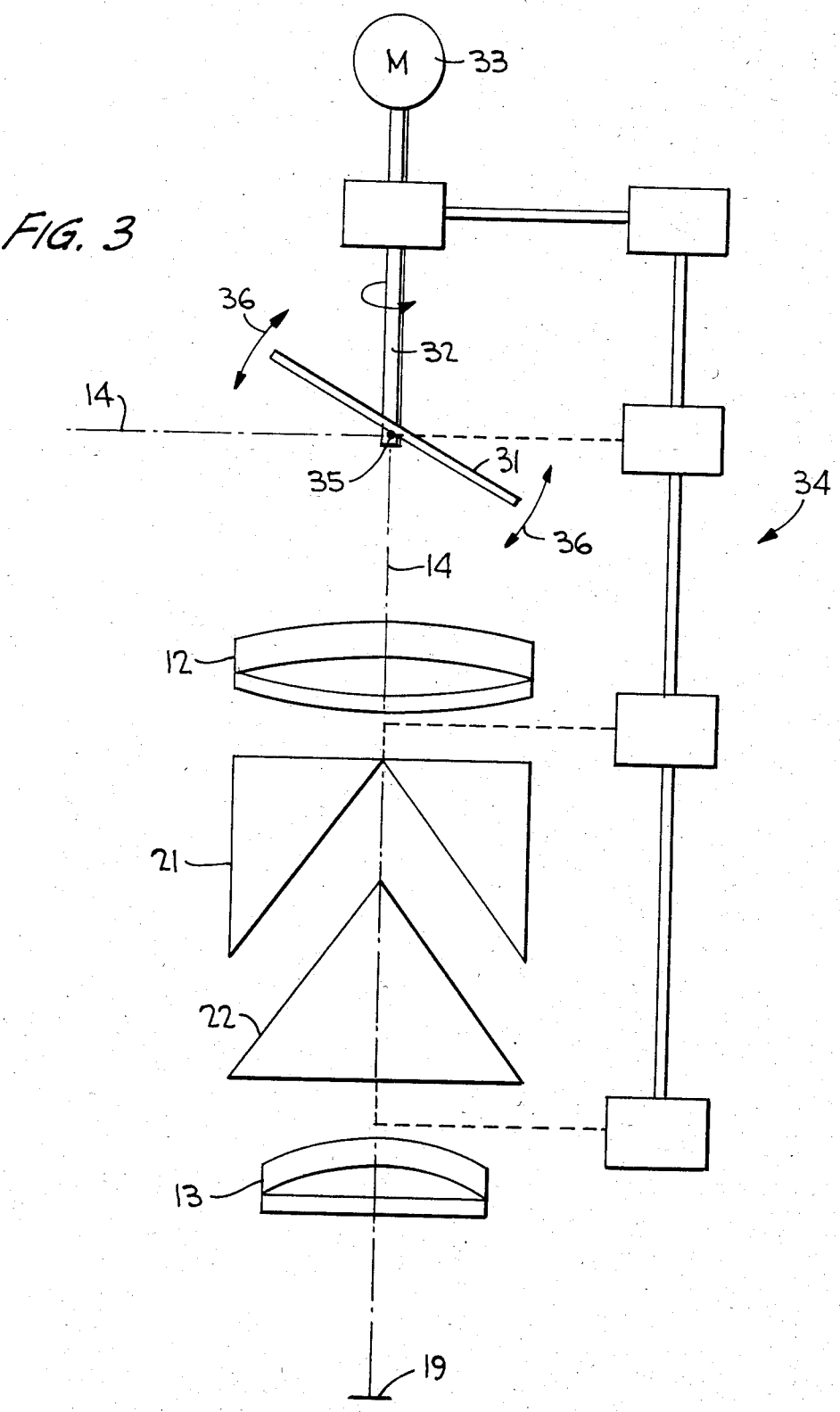
FIG. 3 is an optical schematic diagram of a raster scan system employing the circular scan lens system of the present invention.

The present invention is particularly adapted to be utilized in connection with raster scanning apparatus of the type illustrated schematically in FIG. 3. In particular, the apparatus eliminates the tendency for the raster scanning apparatus of FIG. 3 to rotate the image of the field of view during a raster scan line.

The raster scan apparatus of FIG. 3 includes a planar reflecting mirror 31 that is continuously rotated about axis 14 of the optical system illustrated in FIG. 1. To this end, reflector 31 is mounted on shaft 32 that is coaxial with axis 14 and is driven by motor 33 through a mechanical gearing arrangement 34 that is also drivingly connected to prisms 21 and 22. For each complete rotation of reflector 31, one horizontal or azimuth line of a raster scan is described. The tendency of reflector 31 to rotate the image in its field of view about axis 14 during a raster line scan in the horizontal, i.e., azimuth direction, is obviated by driving prisms 21 and 22 at half the rotational speed of reflector 31. The reflector 31 rotates an image 360° for every 360° of mirror rotation whereas the prisms 21 and 22 rotate an image 360° for every 180° of prism rotation.

To effect a complete raster scan, including a multiplicity of substantially straight, but slightly sloping, parallel horizontal line scans, reflector 31 is driven by motor 33 and mechanical gearing arrangement 34 so that the reflector periodically nods about its intersection with axis 14, at pivot point 35, to describe an arcuate path so that the edges of the reflector move in arcs 36. Typically, reflector 31 is driven by shaft 32 with a rotational velocity of 26 rps and is nodded about pivot point at 35 at a frequency of 1 Hertz. Thereby, a raster scan, from top to bottom, or bottom to top, is completed once each half second, during which there are thirteen raster scan lines.

Figure 4:
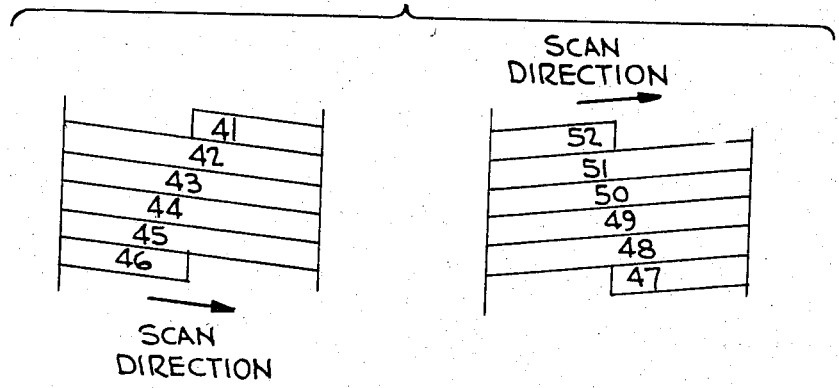
FIG. 4 is a diagram of the raster scan field of view achieved with the system of FIG. 3.

An exemplary raster scan pattern, of abbreviated nature, is illustrated in FIG. 4 and includes six horizontal, downwardly sloping scan lines 41–46 and six horizontal, upwardly sloping scan lines 47–52.

The rotation and nodding of reflector 31 are arranged so that the first line 41 or 47 of each scan begins in the center of the field of view, while the last line 46 or 52 of each scan ends at the center of the field of view. The instantaneous position of the field of view of the line detector in focal plane 19, at one segment of each of the scan lines, is indicated by a relatively short and narrow rectangular like element. The instantaneous position indicated by the rectangles is scanned as indicated by the arrows so that for one complete nodding cycle every portion of the scanned field of view is covered. Of course, because of the scanning action the field of view differs slightly from a rectangle and is formed as a hexagon having parallel sides and slightly sloping top and bottom edges having apices in the center of the field of view.

While there has been described and illustrated one specific embodiment of the invention, it will be clear that variations in the details of the embodiment specifically illustrated and described may be made without departing from the true spirit and scope of the invention as defined in the appended claims.

What is claimed is:

1. An optical system for scanning a field of view onto a focal plane, wherein a relatively narrow portion of the field of view is imaged along an optical axis onto the focal plane comprising means for deflecting the portion of the field of view in a substantially straignt line across the focal plane, whereby the imaged portion of the field of view has a tendency to rotate as it is deflected in the straight line across the focal plane, means synchronized with the deflection for removing the tendency for the field of view to rotate, said last named means including: a Rantsch derotator having an optical axis coincident with the optical axis of the means for imaging, and a lens system having an optical axis coincident with the optical axis of the derotator for focusing the image projected from the derotator onto the focal plane.

2. The system of claim 5 wherein the imaged portion is relatively short and the means for deflecting includes means for sequentially projecting a series of parallel straight lines onto the focal plane, said lines being displaced from each other in a direction substantially at right angles to the direction of line scan.

3. The system of claim 1 wherein the lens system includes a Petzval lens device having spaced lenses with a common optical axis coincident with the optical axis of the Rantsch derotator.

4. The system of claim 3 wherein the derotator is positioned between the spaced lenses.

5. The system of claim 1 wherein a line detector is located in the focal plane.

6. The system of claim 1 wherein the lens system includes a first, converging lens positioned in front of the Rantsch derotator for defining the angular extent of point sources coupled to the optical system, a second lens positioned behind the Rantsch derotator for focusing images projected from the derotator onto the focal plane, said first and second lens having optical axes coincident with the optical axis of the derotator.

7. The system of claim 1 wherein the lens system includes a lens for directing a converging beam from the field of view onto the derotator.

8. The system of claim 1 wherein the imaged portion is relatively short and the means for deflecting includes means for sequentially projecting a series of parallel straight lines onto the focal plane, said lines being displaced from each other in a direction substantially at right angles to the direction of line scan.

9. An optical system for scanning a field of view onto a focal plane wherein a relatively narrow portion of the field of view is imaged along an optical axis onto the focal plane comprising means for deflecting the portion of the field of view in a substantially straight line across the focal plane, whereby the imaged portion of the field of view has a tendency to rotate as it is deflected in the straight line across the focal plane, means synchronized with the deflection for removing the tendency for the field of view to rotate, said last named means including: a pair of beam reflectors having axes coincident with each other and the optical axes of the means for imaging, a first of said reflectors having: a first internal reflecting surface sloping at a predetermined angle in a first direction with respect to the axis of the reflectors, a second internal reflecting surface parallel to the axis of the reflectors, said first surface being transparent to the image reflected from the second surface; the second reflector having: a third internal reflecting surface sloping at the predetermined angle in a second direction with respect to the axis of the reflectors, the first and second directions being opposite from each other, whereby an image projected through the first surface is reflected by the third surface and is projected from it parallel to the axis of the reflection; and a lens system having an optical axis coincident with the optical axis of the reflectors for focusing the image projected from the reflectors onto the focal plane.

10. The system of claim 9 wherein the lens system includes a first, converging lens positioned in front of the beam reflectors for defining the angular extent of point sources coupled to the optical system, a second lens positioned behind the beam reflectors for focusing images projected from the derotator onto the focal plane, said first and second lens having optical axes coincident with the optical axis of the reflector.

11. The system of claim 9 wherein the imaged portion is relatively short and the means for deflecting includes means for sequentially projecting a series of parallel straight lines onto the focal plane, said lines being displaced from each other in a direction substantially at right angles to the direction of line scan.

12. The system of claim 9 wherein the lens system includes Petzval lens device having spaced lenses with a common optical axis coincident with the optical axis of the beam reflectors.

13. The system of claim 12 wherein the pair of reflectors is positioned between the spaced lenses.

14. The system of claim 9 wherein a line detector is located in the focal plane.

* * * * *